United States Patent
Kodama et al.

(10) Patent No.: US 9,941,543 B2
(45) Date of Patent: Apr. 10, 2018

(54) NON-AQUEOUS LIQUID ELECTROLYTE FOR SECONDARY BATTERY AND SECONDARY BATTERY

(71) Applicant: FUJIFILM CORPORATION, Tokyo (JP)

(72) Inventors: Kunihiko Kodama, Kanagawa (JP); Yoshinori Kanazawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 410 days.

(21) Appl. No.: 14/550,428

(22) Filed: Nov. 21, 2014

(65) Prior Publication Data

US 2015/0079464 A1    Mar. 19, 2015

Related U.S. Application Data

(63) Continuation of application No. PCT/JP2013/064071, filed on May 21, 2013.

(30) Foreign Application Priority Data

May 24, 2012  (JP) .................................. 2012-119056

(51) Int. Cl.
*H01M 10/0525*  (2010.01)
*H01M 10/0567*  (2010.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
CPC .................. H01M 4/13; H01M 10/15; H01M 2300/0017; C09D 11/36; C08F 297/042; C08G 2650/22
(Continued)

(56) References Cited

U.S. PATENT DOCUMENTS 7,166,648 B2 *  1/2007  Lachowicz ............... C08F 2/50
                                                522/107
2004/0157130 A1  8/2004  Ohsawa et al.
2007/0207384 A1  9/2007  Nakura

FOREIGN PATENT DOCUMENTS

JP         62-86673 A     4/1987
JP      2000-21443 A      1/2000
(Continued)

OTHER PUBLICATIONS

Machine translation of JP 4365098 A, Nishijima et al., obtained Apr. 19, 2017.*

(Continued)

*Primary Examiner* — Nicholas P D'Aniello
*Assistant Examiner* — Abibatu O Ojo-Amoo
(74) *Attorney, Agent, or Firm* — Sughrue Mion, PLLC

(57) ABSTRACT

A non-aqueous liquid electrolyte for a secondary battery, containing: a compound represented by formula (I); an electrolyte; and an organic solvent, in which the non-aqueous liquid electrolyte has a viscosity of 20 mPa·s at 25° C. or less, (Continued)

wherein Ra, Re and Rf each represent an organic group, and Re and Rf may be bonded with each other to form a ring; Xa represents a substituent represented by formula (a) or (b); Rb and Rc each represent a hydrogen atom or a substituent; and Rd represents a hydrogen atom or an organic group.

9 Claims, 2 Drawing Sheets

(51) Int. Cl.
   *H01M 4/505* (2010.01)
   *H01M 4/525* (2010.01)
(52) U.S. Cl.
   CPC .... *H01M 10/0525* (2013.01); *C08G 2650/22* (2013.01); *H01M 2220/30* (2013.01); *H01M 2300/0025* (2013.01)
(58) Field of Classification Search
   USPC .......................................................... 429/188
   See application file for complete search history.

(56) References Cited

FOREIGN PATENT DOCUMENTS

| | | | |
|---|---|---|---|
| JP | 2001-102088 | A | 4/2001 |
| JP | 2003147218 | A * | 5/2003 |
| JP | 2004-234878 | A | 8/2004 |
| JP | 2005-347222 | A | 12/2005 |
| JP | 2007-242303 | A | 9/2007 |
| JP | 4365098 | B2 | 11/2009 |
| JP | 2010-537369 | A | 12/2010 |
| WO | 2013/001776 | A1 | 1/2013 |

OTHER PUBLICATIONS

Machine translation of JP2003147218 A, Satoru et al., obtained May 11, 2017.*
International Search Report of PCT/JP2013/064071, dated Jul. 9, 2013. [PCT/ISA/210].
Communication dated Jan. 5, 2016 from the Japanese Patent Office issued in corresponding Application No. 2012-119056.

* cited by examiner

{Fig. 1}
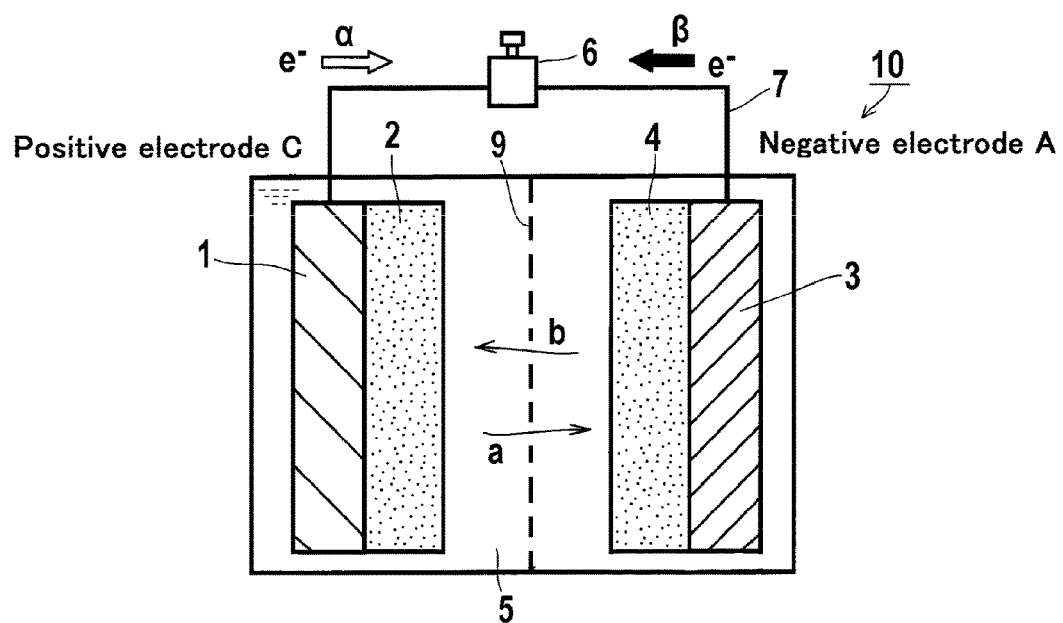

{Fig. 2}
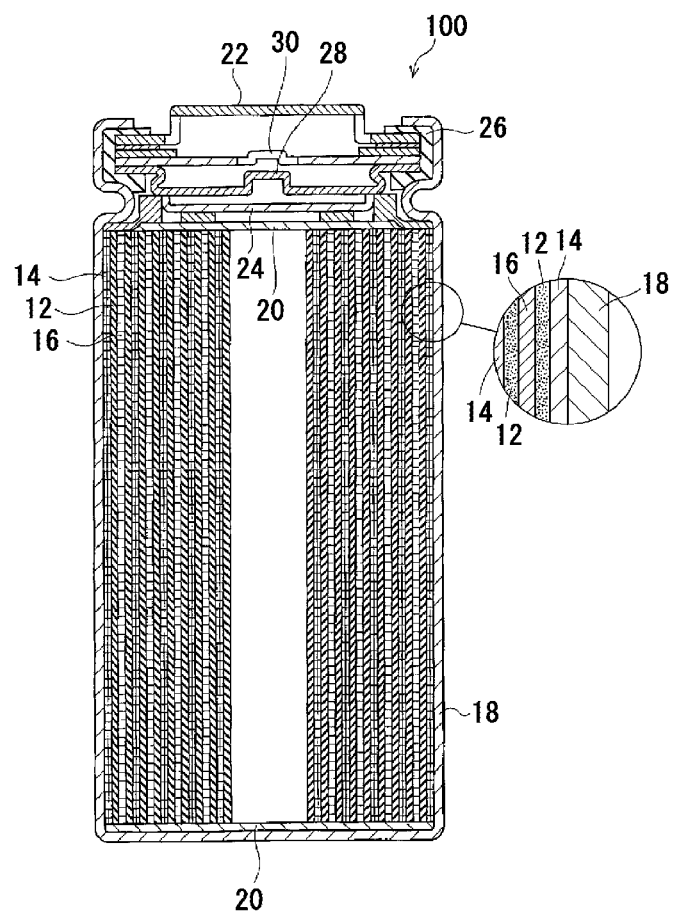

NON-AQUEOUS LIQUID ELECTROLYTE FOR SECONDARY BATTERY AND SECONDARY BATTERY

CROSS-REFERENCE TO RELATED APPLICATIONS

This application is a Continuation of PCT International Application No. PCT/JP2013/064071 filed on May 21, 2013, which claims priority under 35 U.S.C. § 119 (a) to Japanese Patent Application No. 2012-119056 filed on May 24, 2012. Each of the above applications is hereby expressly incorporated by reference, in its entirety, into the present application.

FIELD OF THE INVENTION

The present invention relates to a non-aqueous liquid electrolyte for a secondary battery containing an organic solvent, and a secondary battery using the same.

BACKGROUND ART

Secondary batteries called lithium ion batteries are currently attracting attention. They can broadly be classified into two categories of so called lithium ION secondary batteries and lithium METAL secondary batteries. The lithium METAL secondary batteries utilize precipitation and dissolution of lithium for the operation. Besides, the lithium ION secondary batteries utilize storage and release of lithium in the charge-discharge reaction. These batteries both can realize charge-discharge at large energy densities as compared with lead batteries or nickel-cadmium batteries. By making use of this characteristic, in recent years, these batteries have been widely applied to portable electronic equipment such as camera-integrated VTR's (video tape recorders), mobile telephones, and notebook computers. So as to respond to further expansion of applications as to a power source of the portable electronic equipment, the development has been continually progressed to provide lightweight lithium ion secondary batteries with higher energy densities. Nonetheless, there exists a strong demand for size reduction, service life prolongation, and safety enhancement.

Regarding a liquid electrolyte to be used in lithium ion secondary batteries or lithium metal secondary batteries (hereinafter, these may be collectively referred to simply as a lithium secondary battery), a particular combination of materials has widely been employed in order to realize high electric conductivity and potential stability. That is, a carbonic acid ester-based solvent like propylene carbonate or diethyl carbonate is employed, in combination with an electrolyte salt of lithium hexafluorophosphate or the like.

Besides, with respect to the composition of a liquid electrolyte, a technique for making various kinds of additives to be contained in a liquid electrolyte is proposed for the purpose of improving cycling characteristics and the like. For example, Patent Literature 1 describes that the addition of a particular aromatic compound allows both improvement of a coulombic efficiency and service life prolongation. Further, Patent Literature 2 discloses that use of a particular carbonyl compound allows improvement of both charge efficiency and cycling characteristics.

CITATION LIST

Patent Literatures

Patent Literature 1: JP-A-62-86673 ("JP-A" means unexamined published Japanese patent application)
Patent Literature 2: JP-A-2005-347222

SUMMARY OF THE INVENTION

Problems that the Invention is to Solve

Considering a recent popularization and high-functionalization of the mobile device, it can nonetheless hardly be recognized as that the prior arts mentioned above sufficiently satisfy the requirements of the products. As such, the present invention addresses to the provision of functional additives different from the conventional ones, for making the choice thereof abundant, to be contained in a non-aqueous liquid electrolyte for a secondary battery. Further, the present invention thus addresses to the provision of a secondary battery and a non-aqueous liquid electrolyte for a secondary battery which show good performance over a wide temperature range.

Means to Solve the Problem

The above-described problems of the present invention were solved by the following means.
[1] A non-aqueous liquid electrolyte for a secondary battery, containing:
  a compound represented by formula (I);
  an electrolyte; and
  an organic solvent,
wherein the non-aqueous liquid electrolyte has a viscosity of 20 mPa·s at 25° C. or less,

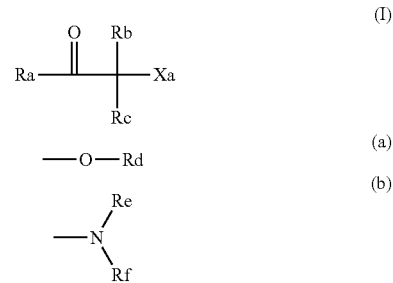

wherein Ra, Re and Rf each represent an organic group, and Re and Rf may be bonded with each other to form a ring; Xa represents a substituent represented by formula (a) or (b); Rb and Rc each represent a hydrogen atom or a substituent; and Rd represents a hydrogen atom or an organic group.
[2] The non-aqueous liquid electrolyte for a secondary battery described in item [1], wherein an aromatic structure is contained in the structure represented by formula (I).
[3] The non-aqueous liquid electrolyte for a secondary battery described in item [1] or [2], containing a polymerizable compound.
[4] The non-aqueous liquid electrolyte for a secondary battery described in any one of items [1] to [3], wherein the compound represented by formula (I) is a compound represented by any one of formulas (I-1) to (I-4):

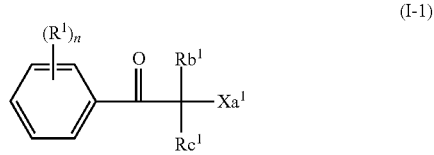

-continued (I-2)
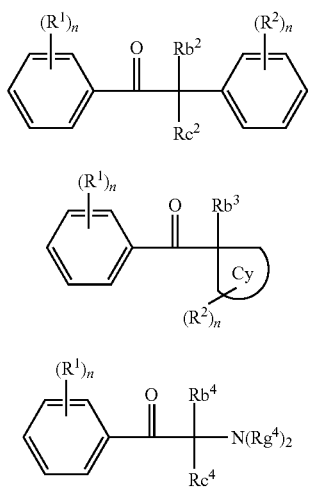

(I-3)

(I-4)

wherein $R^1$ and $R^2$ each represent an alkyl group having 1 to 4 carbon atoms, an alkylthio group having 1 to 4 carbon atoms, a halogen atom, an alkoxy group, or a (cyclic) amino group; n represents an integer from 0 to 5; and when n is 2 or more, $R^1$ and $R^2$ may be different from each other;

wherein $Rb^1$ and $Rc^1$ each represent an alkyl group having 1 to 4 carbon atoms; and $Xa^1$ represents a hydroxyl group, an acyloxy group, or an alkoxy group;

wherein $Rb^2$ represents a hydrogen atom, or an alkoxy group having 1 to 4 carbon atoms; and $Rc^2$ represents a hydroxyl group, an alkoxy group having 1 to 4 carbon atoms, or an acyloxy group;

wherein $Rb^3$ represents a hydroxyl group, an acyloxy group, or an alkoxy group; and Cy represents a 5- to 7-membered non-aromatic ring; and wherein $Rb^4$ and $Rc^4$ each represent an alkyl group having 1 to 4 carbon atoms, or an aralkyl group having 6 to 12 carbon atoms; $Rg^4$ represents an alkyl group having 1 to 4 carbon atoms; and in —N$(Rg^4)_2$, two $Rg^4$'s may combine to form a 5- to 7-membered ring structure which may contain a hetero atom.

[5] The non-aqueous liquid electrolyte for a secondary battery described in any one of items [1] to [3], wherein the compound represented by formula (I) is a compound represented by any one of formulas (Ia) to (Ie):

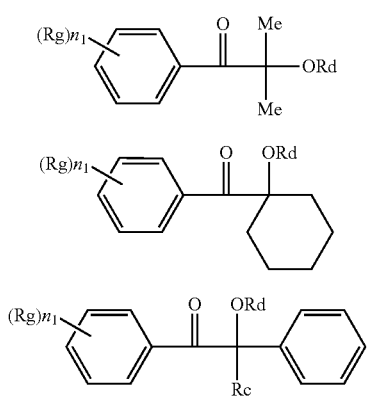

1a

1b

1c

1d

1e

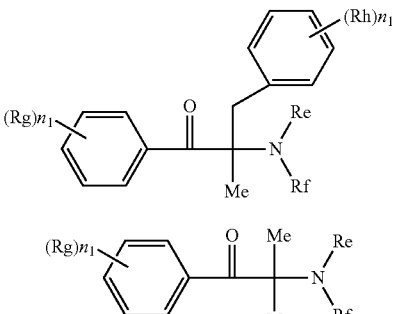

wherein Rc, Rd, Re and Rf have the same meanings as those in formula (I); Me represents a methyl group; Rg represents an alkyl group, an alkoxy group, an acyl group, an acyloxy group, an alkylthio group, an arylthio group, a dialkylamino group, or a cyclic amino group; Rh has the same meaning as Rg; n1 represents an integer from 0 to 5; and when n1 is 2 or more, plural Rg's may be the same as or different from each other.

[6] The non-aqueous liquid electrolyte for a secondary battery described in any one of items [1] to [5], wherein the polymerizable compound is a compound represented by any one of formulas (3-a) to (3-d):

(3-a)
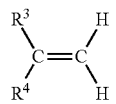

(3-b)
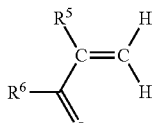

(3-c)
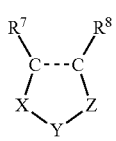

(3-d)
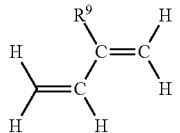

wherein $R^3$ represents a hydrogen atom or an alkyl group; $R^4$ represents an aromatic group, a heterocyclic group, a cyano group, an alkoxy group or an acyloxy group; $R^5$ represents a hydrogen atom, an alkyl group or a cyano group; $R^6$ represents an alkyl group, an alkoxy group or an amino group; $R^7$ and $R^8$ each represent a hydrogen atom, an alkyl group, an alkenyl group or an aromatic group; X, Y and Z each represent a divalent linking group selected from —O—, —S—, —C(═O)—, —C(═S)—, —NR—, —SO—, and —SO$_2$— which may form a 5- or 6-membered ring; R represents an alkyl group or an aromatic group; $R^9$ represents a hydrogen atom or an alkyl group; and the broken-line bond in formula (3-c) means a single bond or a double bond.

[7] The non-aqueous liquid electrolyte for a secondary battery as described in any one of items [1] to [6], containing 0.0001 to 0.1 mol/L of the compound represented by formula (I).
[8] The non-aqueous liquid electrolyte for a secondary battery as described in item [6] or [7], containing 0.001 to 0.1 mol/L of the polymerizable compound.
[9] The non-aqueous liquid electrolyte for a secondary battery described in any one of items [1] to [8], wherein an individual organic component to be contained in the non-aqueous liquid electrolyte has an average molecular weight of 1,000 or less.
[10] A non-aqueous secondary battery, containing the non-aqueous liquid electrolyte for a secondary battery described in any one of items [1] to [9].
[11] The non-aqueous secondary battery described in item [10], wherein the non-aqueous secondary battery contains a lithium metal composite oxide including a nickel atom and/or a manganese atom as a material which constitutes a positive electrode thereof.

In the present specification, unless otherwise specified, substituents adjacent to each other may be bonded or condensed to each other or form a ring.

Effects of the Invention

According to the present invention, functional additives different from the conventional ones can be provided, so as to make the choice thereof abundant, to be contained in the non-aqueous liquid electrolyte for a secondary battery. Further, according to the present invention, the secondary battery and the non-aqueous liquid electrolyte for a secondary battery show good performance over a wide temperature range.

Other and further features and advantages of the invention will appear more fully from the following description, appropriately referring to the accompanying drawings.

BRIEF DESCRIPTION OF THE DRAWINGS

FIG. 1 is a cross-sectional diagram illustrating a mechanism of a lithium secondary battery according to a preferable embodiment of the present invention, by modeling.

FIG. 2 is a cross-sectional diagram schematically illustrating a specific configuration of a lithium secondary battery according to a preferable embodiment of the present invention.

MODE FOR CARRYING OUT THE INVENTION

Hereinafter, an embodiment of the present invention is described. However, the present invention is not construed by being limited thereto.

[Non-Aqueous Liquid Electrolyte for a Secondary Battery]

The non-aqueous liquid electrolyte for a secondary battery of the present invention contains a compound represented by the following formula (I). This compound includes compounds which are generally known as a photopolymerization initiator. The present inventors, as a result of advancement of a research on functional additives to be contained in the non-aqueous liquid electrolyte for a secondary battery, have found that improvement in battery performance over a wide range of temperatures from low temperature to high temperature is seen by the addition of this compound. The compound which is represented by this photopolymerization initiator also exerts its effect together with a polymerizable compound. However, improvement in battery performance also has been achieved even by a single use of this compound. In addition, the present invention does not require light irradiation which is generally essential for the case where the photopolymerization initiator is acted. That is, it is thought that a desirable effect has been achieved not by a known action as a photopolymerization initiator, but by the exertion of a peculiar action in the non-aqueous secondary battery using this kind of liquid electrolyte. When it comes to this point, while taking in presumption, it is thought that the compound represented by formula (I) is subjected to oxidation reaction or reduction reaction in the neighborhood of an electrode thereby to form a primary reactant, and the formed primary reactant or a secondary reactant which has been formed by reaction of the formed primary reactant with a polymerizable compound described below, acts as an electrode-protective film as an example, thereby suppressing deterioration of the battery performance. The present invention is hereinafter described in detail while centering on preferable embodiments thereof.

(Compound Represented by Formula (I))

In the present invention, the compound represented by formula (I) is used.

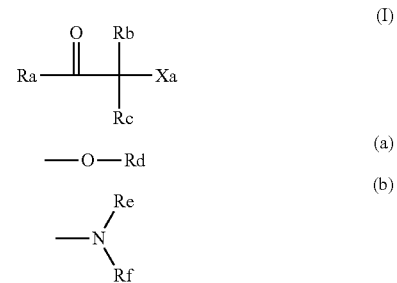

$Ra$

In formula (I), Ra represents an organic group. The organic group is not particularly limited, and specific examples thereof include those exemplified as the substituent T described below. Among these, Ra is preferably an aromatic group, more preferably a phenyl group.

$Rb$

In formula (I), Rb represents a hydrogen atom or a substituent. The substituent is not particularly limited, and specific examples thereof include those exemplified as the substituent T described below. Among these, preferred examples of the organic group include an alkyl group (preferably a methyl group, and an ethyl group), an aralkyl group (preferably a benzyl group, and a 4-methylbenzyl group), and an aryl group (preferably a phenyl group). Preferred examples of the inorganic group include a hydroxyl group.

$Rc$

In formula (I), Rc represents a hydrogen atom or a substituent. The substituent is not particularly limited, and specific examples thereof include those exemplified as the substituent T described below. Among these, preferred examples of the organic group include an alkyl group (preferably a methyl group and an ethyl group), an aralkyl group (preferably a benzyl group and a 4-methylbenzyl group), an aryl group (preferably a phenyl group) and an alkoxy group (preferably a methoxy group). Preferred examples of the inorganic group include a hydroxyl group.

Rb and Rc may be bonded with each other to form a ring. In this case, the formed ring is preferably a 5- to 7-membered ring, and more preferably a piperidine ring, a pyrrolidine ring, or a morpholine ring.

Xa

Xa represents a substituent represented by formula (a) or (b).

Rd

Rd represents a hydrogen atom or an organic group. The organic group is not particularly limited, and specific examples thereof include those exemplified as the substituent T described below. Among these, Rd is preferably an alkyl group (more preferably a methyl group, or an ethyl group), or an acyl group (more preferably an aliphatic acyl group having 2 to 10 carbon atoms, or an aromatic acyl group having 7 to 15 carbon atoms).

Re and Rf

Re and Rf each represent a hydrogen atom or an organic group. The organic group is not particularly limited, and specific examples thereof include those exemplified as the substituent T described below. Among these, an alkyl group having 1 to 8 carbon atoms is preferable. Re and Rf may be bonded with each other to form a ring. In this case, the formed ring is preferably a 5- to 7-membered ring, and more preferably a piperidine ring, a pyrrolidine ring, or a morpholine ring.

When a preferable structure of formula (I) is defined by a different aspect thereof, it is preferable that the compound represented by formula (I) has an aromatic structural moiety in the structure thereof. Preferable examples of the aromatic structural moiety include a phenyl group, a naphthyl group and the like. In addition, the group which composes the aromatic structural moiety may have the substituent T described below.

The compound represented by formula (I) is preferably a compound represented by any one of formulas (I-1) to (I-4).

1 to 4 carbon atoms), or a cyclic or non-cyclic amino group (preferably having 2 to 8 carbon atoms). Plural $R^1$'s or $R^2$'s may be linked to each other to form a ring.

n represents an integer of from 0 to 5. However, in a case where the ring Cy has a substituent, n is limited up to a replaceable number.

$Rb^1$ and $Rc^1$ each represent an alkyl group having 1 to 4 carbon atoms. $Rb^1$ and $Rc^1$ may be linked to each other to form a ring.

$Xa^1$ represents a hydroxyl group, an acyloxy group (preferably having 2 to 10 carbon atoms), or an alkoxy group (preferably 1 to 8 carbon atoms).

$Rb^2$ represents a hydrogen atom, or an alkoxy group having 1 to 4 carbon atoms.

$Rc^2$ represents a hydroxyl group, an alkoxy group having 1 to 4 carbon atoms, or an acyloxy group (preferably having 2 to 10 carbon atoms). $Rb^2$ and $Rc^2$ may be linked to each other to form a ring.

$Rb^3$ represents a hydroxyl group, an acyloxy group (preferably having 2 to 10 carbon atoms), or an alkoxy group (preferably having 1 to 8 carbon atoms).

Cy represents a 5- to 7-membered non-aromatic ring.

$Rb^4$ and $Rc^4$ each represent an alkyl group having 1 to 4 carbon atoms, or an aralkyl group having 6 to 12 carbon atoms. $Rb^4$ and $Rc^4$ may be linked to each other to form a ring.

$Rg^4$ represents an alkyl group having 1 to 4 carbon atoms. However, in $-N(Rg^4)_2$, two $Rg^4$'s may combine to form a 5- to 7-membered ring structure which may contain a hetero atom. Preferred rings are the same as those which are formed by combination of Re and Rf.

The compound represented by formula (I) is further preferably a compound represented by any one of formulas 1a to 1e.

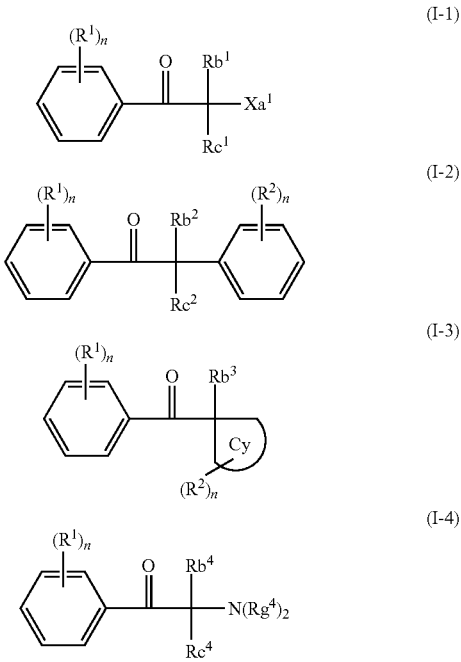

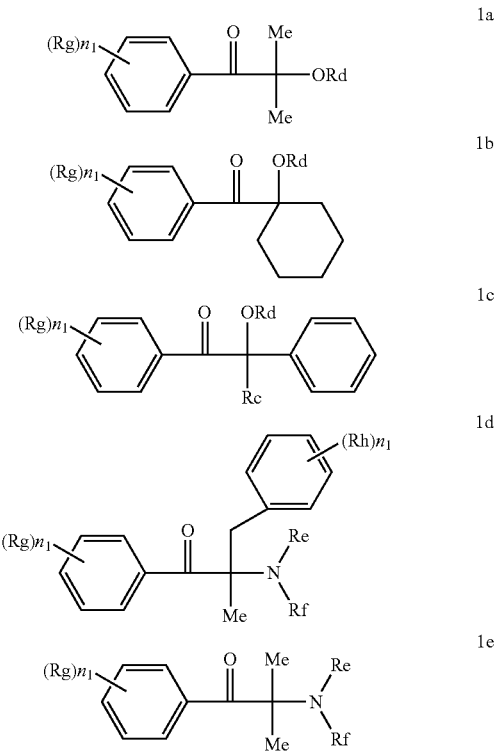

In formulas (I-1) to (I-4), $R^1$ and $R^2$ each represent a hydrogen atom, an alkyl group having 1 to 4 carbon atoms, an alkylthio group having 1 to 4 carbon atoms, a halogen atom, an alkoxy group (preferably an alkoxy group having Rc, Rd, Re and Rf have the same meanings as those in formula (I). Me represents a methyl group.

Rg

Rg represents an alkyl group, an alkoxy group, an acyl group, an acyloxy group, an alkylthio group, an arylthio group, a dialkylamino group, or a cyclic amino group (e.g. a morpholino group, and a piperidyl group).

n1 represents an integer from 0 to 5. In a case where n1 is 2 or more, plural Rg's may be the same as or different from each other.

Rh

Rh has the same meaning as Rg.

Specific examples of the compound represented by formula (I) are shown below.

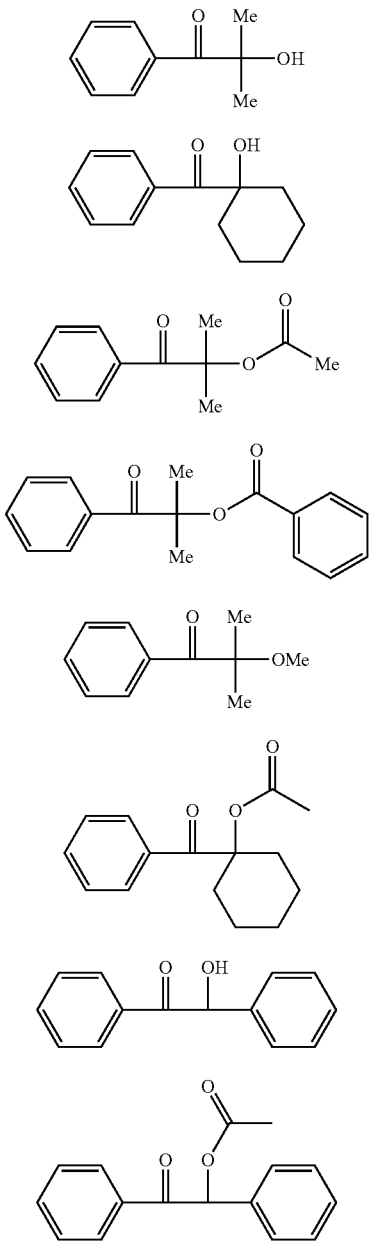

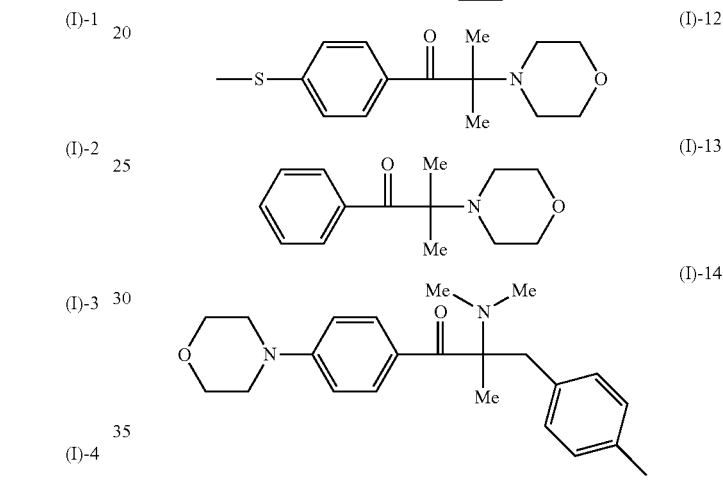

Me: Methyl Group

The content of the compound represented by formula (I) in a liquid electrolyte is preferably 0.0001 mol/L or more, and more preferably 0.0005 mol/L or more, in terms of the lower limit thereof, from the viewpoint of improvement in cycling characteristics. The upper limit thereof is not restricted in particular, but preferably 0.5 mol/L or less, more preferably 0.2 mol/L or less, still more preferably 0.1 mol/L or less, and particularly preferably 0.05 mol/L or less. In the liquid electrolyte of the present invention, it is one of advantages thereof that a potent effect can be exerted by using this functional additive in such a small amount thereof.

When it comes to the relationship to the polymerizable compound described below, the compound represented by formula (I) is added preferably in an amount of 0.1 parts by mass or more, and more preferably in an amount of 1 part by mass or more, with respect to 100 parts by mass of the polymerizable compound. The upper limit thereof is not restricted in particular, but addition in an amount of 100 parts by mass or less is preferable, and addition in an amount of 20 parts by mass or less is more preferable.

(Organic Solvent)

Examples the organic solvent that can be used in the present invention include cyclic carbonates, such as ethylene carbonate, propylene carbonate, and butylene carbonate; linear carbonates, such as dimethyl carbonate, diethyl carbonate, ethyl methyl carbonate, and methyl propyl carbonate; cyclic esters, such as γ-butyrolactone, and γ-valerolactone; linear esters, such as 1,2-dimethoxyethane, and diethylene glycol dimethyl ether; cyclic ethers, such as tetrahydrofuran, 2-methyltetrahydrofuran, tetrahydropyran, 1,3-dioxolane, 4-methyl-1,3-dioxolane, 1,3-dioxane, and 1,4-dioxane; linear esters, such as methyl acetate, ethyl acetate, methyl propionate, ethyl propionate, methyl butyrate, methyl isobutyrate, methyl trimethylacetate, and ethyl trimethylacetate; nitrile compounds, such as acetonitrile, glutaronitrile, adiponitrile, methoxyacetonitrile, and 3-methoxypropionitrile; N,N-dimethylformamide, N-methylpyrrolidinone, N-methyl oxazolidinone, N,N'-dimethylimidazolidinone, nitromethane, nitroethane, sulfolane, trimethyl phosphate, dimethyl sulfoxide, dimethyl sulfoxide, and phosphate. These may be used alone or in combination of two or more. Of these, at least one selected from the group consisting of cyclic carbonates (preferably ethylene carbonate, and propylene carbonate), linear carbonates (preferably dimethyl carbonate, diethyl carbonate and ethyl methyl carbonate) and cyclic esters (preferably γ-butyrolactone) is preferred; and solvent containing a cyclic carbonate and a linear carbonate, and solvent containing a cyclic carbonate and a cyclic ester are more preferred. In particular, a combination of a high-viscosity (high-dielectric constant) solvent (for example, having a relative permittivity $\in$ of 30 or more) such as ethylene carbonate or propylene carbonate with a low-viscosity solvent (for example, having a viscosity of up to 1 m·Pas) such as dimethyl carbonate, ethyl methyl carbonate, diethyl carbonate or γ-butyrolactone is more preferred because the dissociation ability and the ionic mobility of the electrolytic salt are improved.

However, the organic solvent (non-aqueous solvent) used in the present invention is not limited by the foregoing exemplification.

(Electrolyte)

Electrolyte that can be used in the liquid electrolyte of the present invention includes a metal or a salt thereof and a metal ion belonging to Group I or Group II of the Periodic Table or a salt thereof are preferable. The electrolyte is suitably selected depending on the purpose of a liquid electrolyte. For example, lithium salts, potassium salts, sodium salts, calcium salts, and magnesium salts can be mentioned. In a case where the liquid electrolyte is used in a secondary battery or the like, from the viewpoint of the output power of the secondary battery, a lithium salt is preferred. In a case of using the liquid electrolyte of the present invention as the electrolyte of a non-aqueous liquid electrolyte for lithium secondary batteries, it is desirable to select a lithium salt as the salt of the metal ion. The lithium salt is not particularly limited as long as it is a lithium salt that is usually used in the electrolyte of a non-aqueous liquid electrolyte for lithium secondary batteries, but for example, the salts described below are preferred.

(L-1) Inorganic lithium salt: inorganic fluoride salt such as $LiPF_6$, $LiBF_4$, $LiAsF_6$, $LiSbF_6$; perhalogenic acid salts such as $LiClO_4$, $LiBRO_4$, $LiIO_4$; and inorganic chloride salt such as $LiAlCl_4$, and the like.

(L-2) Organic lithium salt containing fluorine: perfluoroalkanesulfonic acid salt such as $LiCF_3SO_3$; perfluoroalkanesulfonylimide salts such as $LiN(CF_3SO_2)_2$, $LiN(CF_3CF_2SO_2)_2$, $LiN(FSO_2)_2$, and $LiN(CF_3SO_2)(C_4F_9SO_2)$; perfluoroalkanesulfonylmethide salts such as $LiC(CF_3SO_2)_3$; fluoroalkyl fluorophosphoric acid salts such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$, and the like.

(L-3) Oxalatoborate salts: lithium bis(oxalate)borate, lithium difluoro(oxalate)borate, and the like.

Among these, $LiPF_6$, $LiBF_4$, $LiAsF_6$, $LiSbF_6$, $LiClO_4$, $Li(Rf^1SO_3)$, $LiN(Rf^1SO_2)_2$, $LiN(FSO_2)_2$, and $LiN(Rf^1SO_2)(Rf^2SO_2)_2$, are preferred; and lithium imide salts such as $LiPF_6$, $LiBF_4$, $LiN(Rf^1SO_2)_2$, $LiN(FSO_2)_2$ and $LiN(Rf^1SO_2)(Rf^2SO_2)_2$ are more preferred. Herein, $Rf^1$ and $Rf^2$ each represent a perfluoroalkyl group.

Meanwhile, as for the lithium salt that is used in the liquid electrolyte, one kind may be used alone, or any two or more kinds may be used in combination.

The ion of metal belonging to Group I or Group II of the Periodic Table or the salt thereof is added to the liquid electrolyte in such an amount that the electrolyte is contained at a preferred salt concentration to be mentioned in the method for preparing the liquid electrolyte below. The salt concentration is selected according to the purpose of the liquid electrolyte, but the content is usually from 10 mass % to 50 mass %, and more preferably from 15 mass % to 30 mass %, relative to the total mass of the liquid electrolyte. When evaluated as the ionic concentration, the salt concentration need only be calculated in terms of the salt with an advantageously applied metal.

(Polymerizable Compound)

In the liquid electrolyte of the present invention, use of a polymerizable compound in addition to the compound represented by formula (I) makes the effect of the present invention more remarkable. The kind of a polymerizable compound that can be used in the present invention is not particularly determined unless it deviates from the purport of the present invention, but examples thereof include a radical polymerizable compound, an anionic polymerizable compound and a cationic polymerizable compound, preferably a radical polymerizable compound and/or an anionic polymerizable compound.

The radical polymerizable compound and the anionic polymerizable compound are preferably a compound having a carbon-carbon multiple bond. Examples of the compound having a carbon-carbon multiple bond include a vinyl compound, a styrene derivative, a (meth)acrylate derivative, and a cyclic olefin (optionally containing a hetero atom in a ring). A compound having a carbon-carbon multiple bond and a polar functional group is more preferable, and examples of the polar functional group include an ester group, a carbonate group, a cyano group, an amide group, an urea group, a sulfolane group, a sulfoxide group, a sulfone group, a sulfonate, a cyclic ether group and a polyalkylene oxide group. These polar groups may form a chain structure or a ring structure.

Examples of the cationic polymerizable compound include an epoxy compound, an oxetane compound, and a vinyl ether compound.

Among them, a compound with a structure represented by any of the following formulae (3-a) to (3-d) is used particularly preferably.

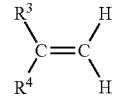

(3-a)

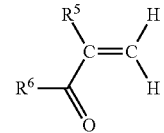

(3-b)

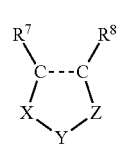

(3-c)

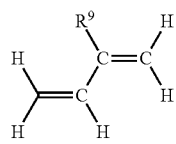

(3-d)

R³

R³ denotes a hydrogen atom or an alkyl group. The alkyl group preferable as R³ is an alkyl group with a carbon number of 1 to 10 (such as methyl, ethyl, hexyl and cyclohexyl), and R³ is more preferably a hydrogen atom.

R⁴

R⁴ denotes an aromatic group, a heterocyclic group, a cyano group, an alkoxy group or an acyloxy group. The aromatic group of R⁴ is preferably a 2π aromatic group with a carbon number of 6 to 10 (such as phenyl and naphtyl), the heterocyclic group is preferably a heteroaromatic group with a carbon number of 4 to 9 (such as furyl, pyridyl, pyrazyl, pyrimidyl and quinolyl), the alkoxy group is preferably an alkoxy group with a carbon number of 1 to 10 (such as methoxy, ethoxy and butoxy), the acyloxy group is preferably an acyloxy group with a carbon number of 1 to 10 (such as an acetyl group and a hexanoyloxy group), and R⁴ is more preferably a phenyl group.

R⁵

R⁵ denotes a hydrogen atom, an alkyl group or a cyano group; the alkyl group is preferably an alkyl group with a carbon number of 1 to 10 (such as methyl, ethyl, hexyl and cyclohexyl), more preferably a hydrogen atom or a methyl group.

R⁶

R⁶ denotes an alkyl group, an alkoxy group or an amino group, more preferably an alkoxy group, that is, the compound represented by formula (3-b) is acrylate or methacrylate. The alkoxy group corresponding to an alcohol portion of ester in this case is preferably an alkoxy group with a carbon number of 1 to 10 (such as methoxy, ethoxy and butoxy), more preferably a methoxy group or an ethoxy group.

R⁷ and R⁸

R⁷ and R⁸ denote a hydrogen atom, an alkyl group, an alkenyl group or an aromatic group. However, when . . . in the formula (3-c) is a single bond, either of R⁷ and R⁸ is preferably an alkenyl group. At this time, the rest of R⁷ and R⁸ is preferably a hydrogen atom. When . . . in the formula (3-c) is a double bond, it is preferable that R⁷ and R⁸ are hydrogen atoms, or R⁷ is a hydrogen atom and R⁸ is an aromatic group. The aromatic group in this case is more preferably an aromatic group with a carbon number of 6 to 10 (such as phenyl and naphtyl).

X, Y and Z

X, Y and Z denote a divalent linking group selected from —O—, —S—, —(C═O)—, —C(═S)—, —NR—, —SO— and —SO₂—, which may form a 5- or 6-membered ring; preferably, X and Y are —O— and Z is —(C═O)—.

R denotes an alkyl group or an aromatic group. A preferable alkyl group signifies the same as that of R³ and a preferable aromatic group signifies the same as that of R⁴.

R⁹

R⁹ represents a hydrogen atom or an alkyl group, preferably a hydrogen atom or an alkyl group having 1 to 10 carbon atoms (e.g., methyl, ethyl, hexyl, or cyclohexyl), and more preferably a hydrogen atom or a methyl group.

The above-described substituents of R³ to R⁹ may further contain another substituent T.

Examples of the substituent T include an alkyl group (preferably an alkyl group having 1 to 20 carbon atoms, e.g. methyl, ethyl, isopropyl, t-butyl, pentyl, heptyl, 1-ethylpentyl, benzyl, 2-ethoxyethyl, or 1-carboxymethyl), an alkenyl group (preferably an alkenyl group having 2 to 20 carbon atoms, e.g. vinyl, allyl, or oleyl), an alkynyl group (preferably an alkynyl group having 2 to 20 carbon atoms, e.g. ethynyl, butadiynyl, or phenylethynyl), a cycloalkyl group (preferably a cycloalkyl group having 3 to 20 carbon atoms, e.g. cyclopropyl, cyclopentyl, cyclohexyl, or 4-methylcyclohexyl), an aryl group (preferably an aryl group having 6 to 26 carbon atoms, e.g. phenyl, 1-naphthyl, 4-methoxyphenyl, 2-chlorophenyl, or 3-methylphenyl), a heterocyclic group (preferably a heterocyclic group having 2 to 20 carbon atoms, more preferably a 5- or 6-membered heterocyclic group having at least one oxygen atom, sulfur atom or nitrogen atom, e.g. 2-pyridyl, 4-pyridyl, 2-imidazolyl, 2-benzimidazolyl, 2-thiazolyl, or 2-oxazolyl), an alkoxy group (preferably an alkoxy group having 1 to 20 carbon atoms, e.g. methoxy, ethoxy, isopropyloxy, or benzyloxy), an aryloxy group (preferably an aryloxy group having 6 to 26 carbon atoms, e.g. phenoxy, 1-naphthyloxy, 3-methylphenoxy, or 4-methoxyphenoxy), an alkoxycarbonyl group (preferably an alkoxycarbonyl group having 2 to 20 carbon atoms, e.g. ethoxycarbonyl, or 2-ethylhexyloxycarbonyl), an amino group (preferably an amino group, an alkylamino group and an arylamino group each having 0 to 20 carbon atoms, e.g. amino, N,N-dimethylamino, N,N-diethylamino, N-ethylamino, or anilino), a sulfamoyl group (preferably a sulfonamide group having 0 to 20 carbon atoms, e.g. N,N-dimethylsulfamoyl, or N-phenylsulfamoyl), an acyl group (preferably an acyl group having 1 to 20 carbon atoms, e.g. acetyl, propionyl, butyryl, or benzoyl), an acyloxy group (preferably an acyloxy group having 1 to 20 carbon atoms, e.g. acetyloxy, or benzoyloxy), a carbamoyl group (preferably a carbamoyl group having 1 to 20 carbon atoms, e.g. N,N-dimethylcarbamoyl, or N-phenylcarbamoyl), an acylamino group (preferably an acylamino group having 1 to 20 carbon atoms, e.g. acetylamino, or benzoylamino), a sulfonamide group (preferably a sulfamoyl group having 0 to 20 carbon atoms, e.g. methane sulfonamide, benzene sulfonamide, N-methyl methane sulfonamide, or N-ethyl benzene sulfonamide), an alkylthio group (preferably an alkylthio group having 1 to 20 carbon atoms, e.g. methylthio, ethylthio, isopropylthio, or benzylthio), an arylthio group (preferably an arylthio group having 6 to 26 carbon atoms, e.g. phenylthio, 1-naphthylthio, 3-methylphenylthio, or 4-methoxyphenylthio), an alkyl- or aryl-sulfonyl group (preferably an alkyl- or aryl-sulfonyl group having 1 to 20 carbon atoms, e.g. methylsulfonyl, ethylsulfonyl, or benzene sulfonyl), a hydroxyl group, a cyano group, and a halogen atom (e.g. a fluorine atom, a chlorine atom, a bromine atom, or an iodine atom). Among these, an alkyl group, an alkenyl group, an aryl group, a heterocyclic group, an alkoxy group, an aryloxy group, an alkoxycarbonyl group, an amino group, an acylamino group, a hydroxyl group and a halogen atom are more preferable; and an alkyl group, an alkenyl group, a heterocyclic group, an alkoxy group, an alkoxycarbonyl group, an amino group, an acylamino group and a hydroxyl group are particularly preferable.

Moreover, each group exemplified as the substituent T may be further substituted with the above-described substituent T.

When a compound, a linking group or the like contains an alkyl group, an alkylene group, an alkenyl group, an alkenylene group or the like, these groups may be a cyclic group or a chain group, may be linear or branched, and may be substituted or unsubstituted as described above. Furthermore, when the compound, the linking group or the like contains an aryl group, a heterocyclic group or the like, they may be monocyclic or fused-cyclic, and may be substituted or unsubstituted as described above.

It is noted that in the present specification, the representation of the compound is used in the sense that not only the compound itself, but also its salt, its complex and its ion are incorporated therein. Further, it is used in the sense that the compound includes a derivative thereof which is modified in a predetermined part in the range of achieving a desired effect. Further, in the present specification, a substituent or a linking group that is not specified by substitution or non-substitution means that the substituent may have an optional substituent. This is applied to the compound that is not specified by substitution or non-substitution. Preferable examples of the substituent include the substituent T described below.

Examples of the polymerizable compound are described below. However, the present invention is not construed by being limited thereto. Herein, when plural substituents and the like are defined at the same time, each of the substituents and the like may be different from or the same as each other.

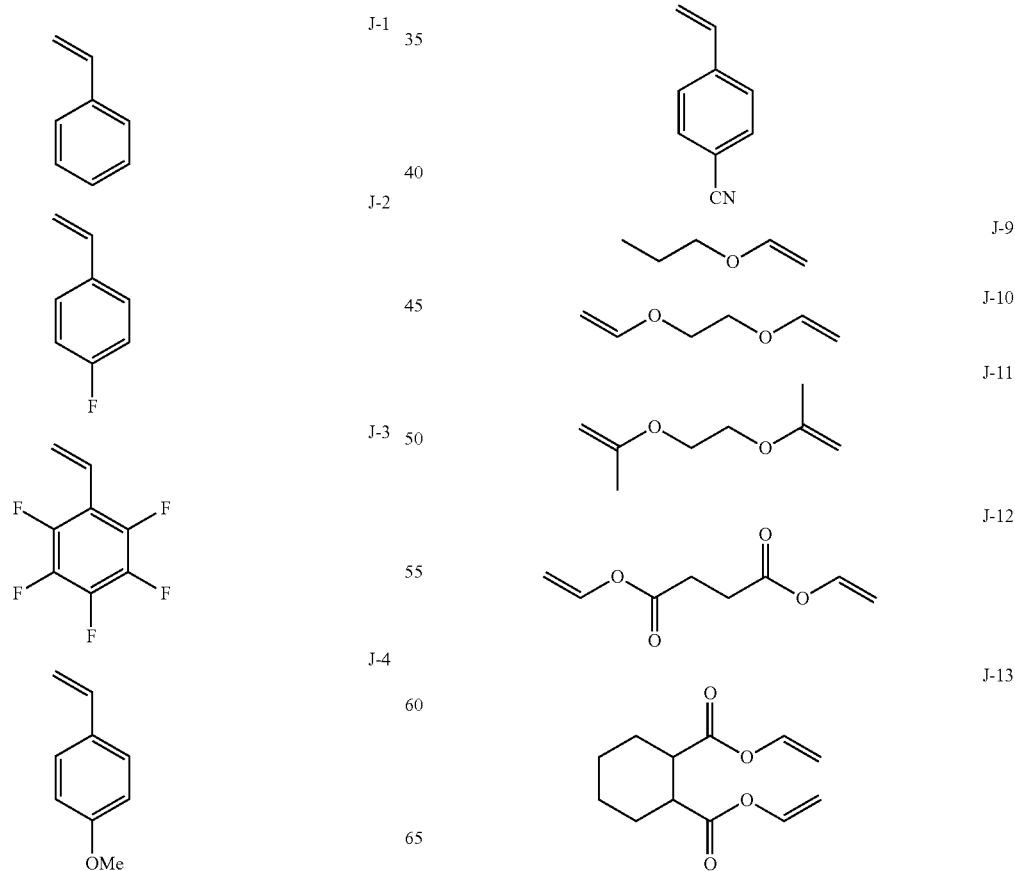

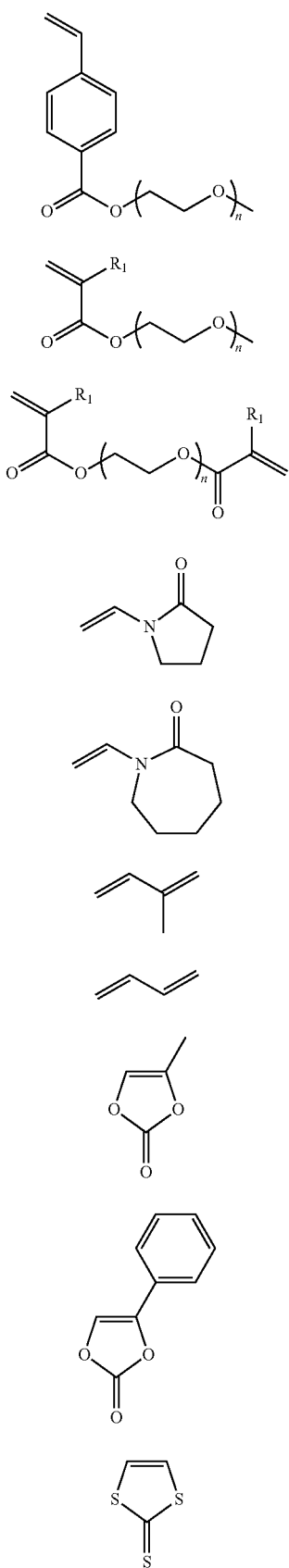
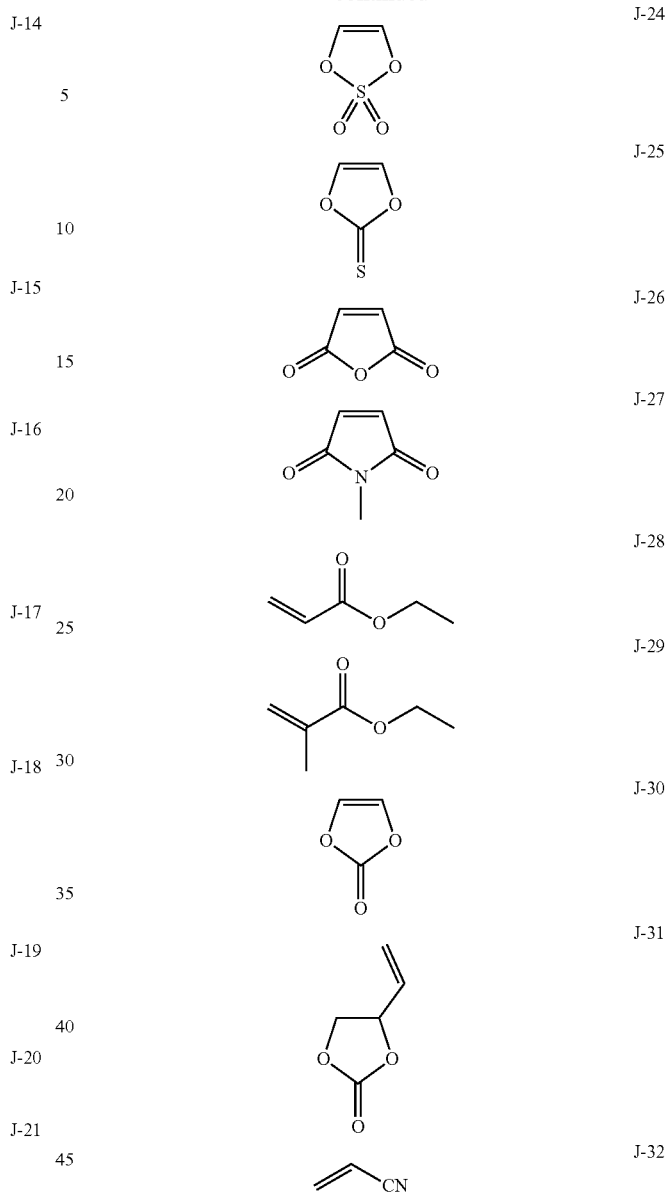

$R_1$ represents a hydrogen atom, an alkyl group, a halogen atom, or a cyano group.

n represents an integer of 1 to 20.

In a case where the addition of the polymerizable compound is small in amount, the effect of improving cycling characteristics becomes small, and in a case where the addition is too large in amount, internal resistance of a battery increases, so that the initial characteristics of a battery are occasionally deteriorated. A concentration range thereof is preferably from 0.001 M to 0.1 M (mol/L), and more preferably from 0.002 M to 0.05 M, in the organic components of the liquid electrolyte.

(Other Components)

In the liquid electrolyte of the present invention, various additives can be used in accordance with the purpose in order to enhance the performance of the battery, to the extent that the effect of the present invention is not impaired. As for such additives, functional additives such as an overcharge preventing agent, a negative electrode film forming agent, a positive electrode protective agent, and a flame retardant may be used.

Furthermore, a combined use of the negative electrode film forming agent and the positive electrode protective agent, or a combined use of the overcharge preventing agent, the negative electrode film forming agent, and the positive electrode protective agent is particularly preferred.

The content ratio of these other additives in the non-aqueous liquid electrolyte is not particularly limited but is each preferably 0.01% by mass or more, particularly preferably 0.1% by mass or more, and further preferably 0.2% by mass or more, with respect to the whole organic components of the non-aqueous liquid electrolyte. The upper limit of the content ratio is preferably 5% by mass, particularly preferably 3% by mass, and further preferably 2% by mass. The addition of these compounds allows rupture and ignition of a battery to be restrained during disorder due to overcharge, and allows capacity maintenance characteristics and cycling characteristics to be improved after preserving at high temperature.

The non-aqueous liquid electrolyte for a secondary battery of the present invention is preferably composed of organic components, in which each of the organic components has a molecular weight of 1,000 or less, and more preferably 500 or less. This is predicated on an embodiment of the present invention, and means that the non-aqueous secondary battery or its electrolyte liquid of the present invention does not concern either a solid electrolyte secondary battery or a polymer electrolyte secondary battery. Meanwhile, when it comes to the non-aqueous liquid electrolyte for a secondary battery, this indicates not to be a material used for the solid electrolyte secondary battery or the polymer electrolyte secondary battery, that is to say, this indicates the intended use for a secondary battery using a liquid electrolyte (this may be sometimes called "a liquid electrolyte secondary battery".

Unless it is explicitly stated otherwise, the molecular weight is defined as the values obtained by measurement in accordance with a GPC (Gel Permeation Chromatography). The molecular weight is defined as polystyrene-converted weight-average molecular weight. The gel charged into the column used in the GPC method is preferably a gel having an aromatic compound as a repeating unit, and examples thereof include a gel including styrene-divinylbenzene copolymers. The column is preferably used in the form where 2 to 6 columns are connected. Examples of a solvent used include ether-series solvents such as tetrahydrofuran, amide-series solvents such as N-methylpyrrolidone, halogen-series solvents such as chloroform, and aromatic solvents such as 1,2-dichlorobenzene. The measurement is preferably carried out at a flow rate of the solvent in the range of 0.1 to 2 mL/min, and most preferably in the range of 0.5 to 1.5 mL/min. By carrying out the measurement within these ranges, there is no occurrence of loading in an apparatus, and thus, the measurement can be carried out further efficiently. The measurement temperature is preferably carried out at from 10° C. to 50° C., and most preferably from 20° C. to 40° C. The measurement can also be carried out at the temperature from 50° C. to 200° C. using a column having a high temperature available therefor. A column and a carrier to be used can be properly selected, according to the property of a polymer compound to be measured.

In the non-aqueous liquid electrolyte for a secondary battery of the present invention, its viscosity (25° C.) is 20 mPa·s or less, preferably 10 mPa·s or less, and more preferably 5 mPa·s or less. The lower limit is not restricted in particular, but 0.5 mPa·s or more is practical. This viscosity range is set for distinction from a solid electrolyte. If the viscosity of the solid electrolyte is daringly defined, it gets $\infty$. In the present specification, the value of viscosity refers to a value measured in accordance with the following method, unless it is explicitly stated otherwise. Meanwhile, the viscosity of a raw material solution of the polymer which composes the solid electrolyte may fall within the range of viscosity defined above. However, this is a raw material solution (precursor) for a liquid electrolyte, and therefore this is not the liquid electrolyte.

<Measuring Method of Viscosity>

1 mL of a sample solution is measured by means of a rheometer (CLS 500) with 4-cm/2° Steel Cone (both manufactured by TA Instruments Co.). The measurement is started after previously keeping the sample solution at a measurement initiating temperature until the liquid temperature becomes constant. The measuring temperature is set at 25° C.

[Method of Preparing Liquid Electrolyte and the Like]

The non-aqueous liquid electrolyte for a secondary battery of the present invention is prepared by a usual method in such a manner that the above-mentioned each component is dissolved in the non-aqueous liquid electrolyte solvent including an example using a lithium salt as a salt of metal ion.

The term "non-aqueous" as used in the present invention means that water is substantially not contained, and a small amount of water may be contained as long as the effects of the present invention are not impaired. In consideration of obtaining good properties, water is preferably contained in an amount of up to 200 ppm and more preferably up to 100 ppm. Although the lower limit is not particularly restricted, it is practical for the water content to be 10 ppm or more in consideration of inevitable incorporation.

[Secondary Battery]

In the present invention, a non-aqueous secondary battery preferably contains the above-mentioned non-aqueous liquid electrolyte. A preferable embodiment is described while referring to FIG. 1 schematically illustrating a mechanism of a lithium ion secondary battery. The lithium ion secondary battery 10 of the present embodiment includes the above-described non-aqueous liquid electrolyte 5 for a secondary battery of the present invention, a positive electrode C (current collector for positive electrode 1, positive electrode active material layer 2) capable of insertion and release of lithium ions, and a negative electrode A (current collector for negative electrode 3, negative electrode active material layer 4) capable of insertion and discharge, or dissolution and precipitation, of lithium ions. In addition to these essential members, the lithium secondary battery may also be constructed to include a separator 9 that is disposed between the positive electrode and the negative electrode, current collector terminals (not shown), and an external case (not shown), in consideration of the purpose of using the battery, the form of the electric potential, and the like. According to the necessity, a protective element may also be mounted in at least any one side of the interior of the battery and the exterior of the battery. By employing such a structure, transfer of lithium ions a and b occurs in the liquid electrolyte 5, and charging $\alpha$ and discharging $\beta$ can be carried out. Thus, operation and accumulation can be carried out by means of an operating means 6 and the circuit wiring 7. The configuration of the lithium secondary battery, which is a preferable embodiment of the present invention, will be described in detail below.

(Battery Shape)

There are no particular limitations on the battery shape that is applied to the lithium secondary battery of the present embodiment, and examples of the shape include a bottomed cylindrical shape, a bottomed rectangular shape, a thin flat shape, a sheet shape, and a paper shape. The lithium secondary battery of the present embodiment may have any of these shapes. Furthermore, an atypical shape such as a horseshoe shape or a comb shape, which is designed in consideration of the form of the system or device into which the lithium secondary battery is incorporated, may also be used. Among them, from the viewpoint of efficiently releasing the heat inside of the battery to the outside thereof, a rectangular shape such as a bottomed rectangular shape or a thin flat shape, which has at least one relatively flat and large-sized surface, is preferred.

In a battery having a bottomed cylindrical shape, since the external surface area relative to the power generating element to be charged is small, it is preferable to design the battery such that the Joule heating that is generated due to the internal resistance at the time of charging or discharging is efficiently dissipated to the outside. Furthermore, it is preferable to design the lithium secondary battery such that the filling ratio of a substance having high heat conductibility is increased so as to decrease the temperature distribution inside the battery. FIG. 2 is an example of a bottomed cylindrical lithium secondary battery 100. This cell is a bottomed cylindrical lithium secondary battery 100 in which a positive electrode sheet 14 and a negative electrode sheet 16 that are superimposed with a separator 12 interposed therebetween, are wound and accommodated in a packaging can 18.

With regard to the bottomed rectangular shape, it is preferable that the value of the ratio of twice the area of the largest surface, S (the product of the width and the height of the external dimension excluding terminal areas, unit: cm$^2$) and the external thickness of the battery, T (unit: cm), 2S/T, be 100 or greater, and more favorably 200 or greater. By having the largest surface made large, even in the case of batteries of high output power and large capacity, characteristics such as cycle characteristics and high temperature storage can be enhanced, and also, the heat dissipation efficiency at the time of abnormal heat generation can be increased. Thus, it is advantageous from the viewpoint that "valve action" or "bursting", which will be described below, can be prevented.

(Battery-Constituting Members)

The lithium secondary battery of the present embodiment is constituted to include the liquid electrolyte 5, an electrode mixture of a positive electrode C and a negative electrode A, and basic member of the separator 9, based on FIG. 1. These various members will be described below. The lithium secondary battery of the present invention includes at least the non-aqueous liquid electrolyte for a secondary batteries of the present invention as the liquid electrolyte.

(Electrode Mixtures)

An electrode mixture is a composite obtained by applying a dispersion of an active substance, an electroconductive agent, a binder, a filler and the like on a current collector (electrode substrate). For a lithium battery, a positive electrode mixture in which the active substance is a positive electrode active substance, and a negative electrode mixture in which the active substance is a negative electrode active substance are preferably used. Next, each component in dispersions composing the electrode mixture (composition for electrode, electrode mixture) is described.

Positive Electrode Active Substance

A particulate positive electrode active substance may be used. Specifically, a transition metal oxide which is capable of reversible insertion and release of lithium ions can be used, but it is preferable to use a lithium-containing transition metal oxide. Suitable examples of a lithium-containing transition metal oxide that is preferably used as a positive electrode active substance, include lithium-containing oxides containing one or more of Ti, V, Cr, Mn, Fe, Co, Ni, Cu, Mo, and W. Furthermore, alkali metals other than lithium (elements of Group 1 (Ia) and Group 2 (IIa) of the Periodic Table), and/or Al, Ga, In, Ge, Sn, Pb, Sb, Bi, Si, P, B and the like may also be incorporated. The amount of incorporation is preferably from 0 mol % to 30 mol % relative to the amount of the transition metal.

Among the lithium-containing transition metal oxides that are preferably used as the positive electrode active substance, a substance synthesized by mixing a lithium compound and a transition metal compound (herein, the transition metal refers to at least one selected from Ti, V, Cr, Mn, Fe, Co, Ni, Mo, and W) such that the total molar ratio of lithium compound/transition metal compound is 0.3 to 2.2.

Furthermore, among the lithium compound/transition metal compound, materials containing $Li_gM3O_2$ (wherein M3 represents one or more elements selected from Co, Ni, Fe, and Mn; and g represents 0 to 1.2), or materials having a spinel structure represented by $Li_hM4_2O$ (wherein M4 represents Mn; and h represents 0 to 2) are particularly preferred. As M3 and M4 described above, Al, Ga, In, Ge, Sn, Pb, Sb, Bi, Si, P, B, or the like may also be incorporated in addition to the transition metal. The amount of incorporation is preferably from 0 mol % to 30 mol % relative to the amount of the transition metal.

Among the materials containing $Li_gM3O_2$ and the materials having a spinel structure represented by $Li_hM4_2O_4$, $Li_gCoO_2$, $Li_gNiO_2$, $Li_gMnO_2$, $Li_gCo_jNi_{1-j}O_2$, $Li_hMn_2O_4$, $LiNiMn_{1-j}O_2$, $LiCo_jNi_hAl_{1-j-h}O_2$, $LiCo_jNi_hMn_{1-j-h}O_2$, $LiMn_hAl_{2-h}O_4$, and $LiMn_hNi_{2-h}O_4$ (wherein in the respective formulas, g represents 0.02 to 1.2; j represents 0.1 to 0.9; and h represents 0 to 2) are particularly preferred; and $Li_gCoO_2$, $LiMn_2O_4$, $LiNi_{0.85}Co_{0.01}Al_{0.05}O_2$, and $LiNi_{0.33}Co_{0.33}Mn_{0.33}O_2$ are most preferred. From the viewpoints of high capacity and high power output, among those described above, an electrode containing Ni is more preferred. Herein, the g value and the h value are values prior to the initiation of charging and discharging, and are values that increase or decrease as charging or discharging occurs. Specific examples thereof include $LiCoO_2$, $LiNi_{0.5}Mn_{0.5}O_2$, $LiNi_{0.85}Co_{0.01}Al_{0.05}O_2$, $LiNi_{0.33}Co_{0.33}Mn_{0.33}O_2$, $LiMn_{1.8}Al_{0.2}O_4$, and $LiMn_{1.5}Ni_{0.5}O_4$.

Preferred examples of the transition metal of the lithium-containing transition metal phosphate compound include V, Ti, Cr, Mn, Fe, Co, Ni, and Cu, and specific examples of the compound include iron phosphates such as $LiFePO_4$, $Li_3Fe_2(PO_4)_3$, and $LiFeP_2O_7$; cobalt phosphates such as $LiCoPO_4$; and compounds in which a portion of the transition metal atoms that constitute the main component of these lithium-transition metal phosphate compounds has been substituted by another metal such as Al, Ti, V, Cr, Mn, Fe, Co, Li, Ni, Cu, Zn, Mg, Ga, Zr, Nb, or Si.

The average particle size of the positive electrode active substance used in the non-aqueous electrolyte secondary battery is not particularly limited, but the average particle size is preferably from 0.1 μm to 50 μm. The specific surface area is not particularly limited, but specific surface area as measured by the BET method is preferably from 0.01 m$^2$/g to 50 m$^2$/g. Furthermore, the pH of the supernatant obtainable when 5 g of the positive electrode active substance is dissolved in 100 mL of distilled water is preferably from 7 to 12.

In order to adjust the positive electrode active substance to a predetermined particle size, a well-known pulverizer or classifier may be used. For example, a mortar, a ball mill, a vibrating ball mill, a vibrating mill, a satellite ball mill, a planetary ball mill, a swirling air flow jet mill, or a sieve is used. The positive electrode active substance obtained according to the calcination method may be used after washing the substance with water, an acidic aqueous solution, an alkaline aqueous solution, or an organic solvent.

Negative Electrode Active Substance

There are no particular limitations on the negative electrode active substance, as long as the negative electrode active substance is capable of reversible insertion and release of lithium ions, and examples thereof include carbonaceous materials, metal oxides such as tin oxide and silicon oxide, metal composite oxides, simple lithium substance or lithium alloys such as a lithium-aluminum alloy, and metals capable of forming an alloy with lithium, such as Sn and Si.

For these materials, one kind may be used alone, or two or more kinds may be used in any combination at any proportions. Among them, carbonaceous materials or lithium composite oxides are preferably used from the viewpoint of safety.

Furthermore, the metal composite oxides are not particularly limited as long as the materials are capable of adsorption and release of lithium, but it is preferable for the composite oxides to contain titanium and/or lithium as constituent components, from the viewpoint of high current density charging-discharging characteristics.

A carbonaceous material that is used as a negative electrode active substance is a material which is substantially composed of carbon. Examples thereof include petroleum pitch, natural graphite, artificial graphite such as vapor-grown graphite, and carbonaceous materials obtained by firing various synthetic resins such as PAN-based resins and furfuryl alcohol resins. Further, the examples include various carbon fibers such as PAN-based carbon fibers, cellulose-based carbon fibers, pitch-based carbon fibers, vapor-grown carbon fibers, dehydrated PVA-based carbon fibers, lignin carbon fibers, vitreous carbon fibers, and activated carbon fibers; mesophase microspheres, graphite whiskers, and tabular graphite.

These carbonaceous materials may be classified into hardly graphitized carbon materials and graphite-based carbon materials, according to the degree of graphitization. Also, it is preferable that the carbonaceous materials have the plane spacing, density, and size of crystallites described in JP-A-62-22066, JP-A-2-6856, and JP-A-3-45473. The carbonaceous materials are not necessarily single materials, and a mixture of natural graphite and an artificial graphite as described in JP-A-5-90844, a graphite having a coating layer as described in JP-A-6-4516, and the like can also be used.

In regard to the metal oxides and metal composite oxides that are negative electrode active substances used in the non-aqueous secondary battery, at least one of these may be included. The metal oxides and metal composite oxides are particularly preferably amorphous oxides, and furthermore, chalcogenides which are reaction products of metal elements and the elements of Group 16 of the Periodic Table are also preferably used. The term "amorphous" as used herein means that the substance has a broad scattering band having an apex at a 2θ value in the range of 20° to 40°, as measured by an X-ray diffraction method using CuKα radiation, and the substance may also have crystalline diffraction lines. The highest intensity obtainable among the crystalline diffraction lines exhibited at a 2θ value in the range of from 40° to 70° is preferably 100 times or less, and more preferably 5 times or less, than the diffraction line intensity of the apex of the broad scattering band exhibited at a 2θ value in the range of from 20° to 40°, and it is particularly preferable that the substance does not have any crystalline diffraction line.

Among the group of compounds composed of the amorphous oxides and chalcogenides, amorphous oxides and chalcogenides of semi-metallic elements are more preferred, and oxides and chalcogenides formed from one kind alone or combinations of two or more kinds of the elements of Group 13 (IIIB) to Group 15 (VB) of the Periodic Table, Al, Ga, Si, Sn, Ge, Pb, Sb and Bi are particularly preferred. Specific preferred examples of the amorphous oxides and chalcogenides include, for example, $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, and $SnSiS_3$. Furthermore, these may also be composite oxides with lithium oxide, for example, $Li_2SnO_2$.

The average particle size of the negative electrode active substance used in the non-aqueous secondary battery of the present invention is preferably from 0.1 μm to 60 μm. In order to adjust the negative electrode active substance to a predetermined particle size, a well-known pulverizer or classifier may be used. For example, a mortar, a ball mill, a sand mill, a vibrating ball mill, a satellite ball mill, a planetary ball mill, a swirling air flow jet mill, and a sieve are favorably used. At the time of pulverization, wet pulverization of using water or an organic solvent such as methanol to co-exist with the negative electrode active substance can also be carried out as necessary. In order to obtain a desired particle size, it is preferable to perform classification. There are no particular limitations on the classification method, and a sieve, an air classifier or the like can be used as necessary. Classification may be carried out by using a dry method as well as a wet method.

The chemical formula of the compound obtained by the calcination method can be obtained by using an inductively coupled plasma (ICP) emission spectroscopic method as a measurement method, and computed from the mass difference of the powder measured before and after calcination, as a convenient method.

In the present invention, suitable examples of the negative electrode active substance that can be used together with the amorphous oxide negative electrode active substances represented by Sn, Si and Ge, include carbon materials that are capable of adsorption and release of lithium ions or lithium metal, as well as lithium, lithium alloys, and metal capable of alloying with lithium.

In the present invention, it is preferable to use lithium titanate, more specifically lithium titanium oxide ($Li[Li_{1/3}Ti_{5/3}]O_4$), as an active material of the negative electrode. By using this as a negative electrode active material, the effects due to the compound represented by formula (I) or a combination thereof together with a polymerizable compound are enhanced whereby more excellent battery performances can be exhibited.

Electroconductive Material

As for the electroconductive material, any material may be used as long as it is an electron conductive material which does not cause a chemical change in a constructed secondary battery, and any known electroconductive material can be used. Usually, electroconductive materials such as natural graphite (scale-like graphite, flaky graphite, earthly graphite, and the like), artificial graphite, carbon black, acetylene black, Ketjen black, carbon fibers, metal powders (copper, nickel, aluminum, silver (described in JP-A-63-10148, 554), and the like), metal fibers, and polyphenylene derivatives (described in JP-A-59-20,971) can be incorporated alone or as mixtures thereof. Among them, a combination of graphite and acetylene black is particularly preferred. The amount of addition of the electroconductive agent is preferably from 1 mass % to 50 mass %, and more preferably from 2 mass % to 30 mass %. In the case of carbon or graphite, the amount of addition is particularly preferably from 2 mass % to 15 mass %.

Binder

In the present invention, it is preferable that a binder for retaining the electrode mixture described above is used.

Preferred examples of the binder include polysaccharides, thermoplastic resins, and polymers having rubber elasticity, and among them, preferred examples include emulsions (latexes) or suspensions of starch, carboxymethyl cellulose, cellulose, diacetyl cellulose, methyl cellulose, hydroxyethyl cellulose, hydroxypropyl cellulose, sodium alginate; water-soluble polymers such as poly(acrylic acid), poly(sodium acrylate), polyvinylphenol, poly(vinyl methyl ether), poly(vinyl alcohol), polyvinylpyrrolidone, polyacrylonitrile, polyacrylamide, poly(hydroxy(meth)acrylate), and a styrene-maleic acid copolymer; poly(vinyl chloride), polytetrafluoroethylene, poly(vinylidene fluoride), a tetrafluoroethylene-hexafluoropropylene copolymer, a vinylidene fluoride-tetrafluoroethylene-hexafluoropropylene copolymer, polyethylene, polypropylene, an ethylene-propylene-diene terpolymer (EPDM), a sulfonated EPDM, a poly(vinyl acetal) resin, (meth)acrylic acid ester copolymers containing (meth)acrylic acid esters such as methyl methacrylate and 2-ethylhexyl acrylate, a (meth)acrylic acid ester-acrylonitrile copolymer, a poly(vinyl ester) copolymer containing a vinyl ester such as vinyl acetate, a styrene-butadiene copolymer, an acrylonitrile-butadiene copolymer, polybutadiene, a neoprene rubber, a fluorine rubber, poly(ethylene oxide), a polyester polyurethane resin, a polyether polyurethane resin, a polycarbonate polyurethane resin, a polyester resin, a phenolic resin, and an epoxy resin. More preferred examples include a poly(acrylic acid ester)-based latex, carboxymethyl cellulose, polytetrafluoroethylene, and poly(vinylidene fluoride).

As for the binder, one kind may be used alone, or two or more kinds may be used as mixtures. If the amount of addition of the binder is small, the retention power and the aggregating power of the electrode mixture are weakened. If the amount of addition is too large, the electrode volume increases, and the capacity per unit volume or unit mass of the electrode is decreased. For such reasons, the amount of addition of the binder is preferably from 1 mass % to 30 mass %, and more preferably from 2 mass % to 10 mass %.

Filler

The electrode mixture may contain a filler. Regarding the material that forms the filler, any fibrous material that does not cause a chemical change in the secondary battery of the present invention can be used. Usually, fibrous fillers formed from olefinic polymers such as polypropylene and polyethylene, and materials such as glass and carbon are used. The amount of addition of the filler is not particularly limited, but the amount of addition is preferably from 0 mass % to 30 mass %.

Current Collector

As the current collector for the positive and negative electrodes, an electron conductor that does not cause a chemical change in the non-aqueous electrolyte secondary battery is used. Preferred examples of the current collector for the positive electrode include aluminum, stainless steel, nickel, and titanium, as well as aluminum or stainless steel treated with carbon, nickel, titanium, or silver on the surface. Among them, aluminum and aluminum alloys are more preferred.

Preferred examples of the current collector for the negative electrode include aluminum, copper, stainless steel, nickel, and titanium, and more preferred examples include aluminum, copper and copper alloys.

Regarding the shape of the current collector, a film sheet-shaped current collector is usually used, but a net-shaped material, a film sheet formed by punching, a lath material, a porous material, a foam, a material obtained by molding a group of fibers, and the like can also be used. The thickness of the current collector is not particularly limited, but the thickness is preferably from 1 μm to 500 μm. Furthermore, it is also preferable to provide surface unevenness on the surface of the current collector through a surface treatment.

Electrode mixtures for lithium secondary batteries are formed by members appropriately selected from these materials.

(Separator)

The separator used in the non-aqueous secondary battery is not particularly limited as long as the separator is formed of a material which electronically insulates the positive electrode and the negative electrode, and has mechanical strength, ion permeability, and oxidation-reduction resistance at the surfaces in contact with the positive electrode and the negative electrode. Examples of such a material that may be used include porous polymer materials or inorganic materials, organic-inorganic hybrid materials, and glass fibers. These separators preferably have a shutdown function for securing safety, that is, a function of increasing resistance by blocking the voids at 80° C. or more, and thereby cutting off the electric current, and the blocking temperature is preferably from 90° C. to 180° C.

The shape of the pores of the separator is usually circular or elliptical, and the size is from 0.05 μm to 30 μm, and preferably from 0.1 μm to 20 μm. Furthermore, as in the case of producing the material by an extension method or a phase separation method, a material having rod-shaped or irregularly shaped pores may also be used. The proportion occupied by these pores, that is, the pore ratio, is 20% to 90%, and preferably 35% to 80%.

Regarding the polymer materials described above, a single material such as cellulose nonwoven fabric, polyethylene, or polypropylene may be used, or a compositized material of two or more kinds may also be used. A laminate of two or more kinds of finely porous films that are different in the pore size, pore ratio, pore blocking temperature and the like, is preferred.

As the inorganic material, oxides such as alumina and silicon dioxide, nitrides such as aluminum nitride and silicon nitride, and sulfates such as barium sulfate and calcium sulfate are used, and a particle-shaped or fiber-shaped material is used. Regarding the form, a thin film-shaped material such as a nonwoven fabric, a woven fabric, or a finely porous film is used. In the case of a thin film-shaped material, a material having a pore size of from 0.01 μm to 1 μm and a thickness of from 5 μm to 50 μm is favorably used. In addition to the independent thin film-shaped materials described above, a separator obtained by forming a composite porous layer containing particles of the inorganic substance described above, as a surface layer of the positive electrode and/or the negative electrode by using a binder made of a resin, can be employed. For example, a separator in which alumina particles having a 90% particle size of less than 1 μm are formed on both surfaces of the positive electrode as porous layers by using a binder of a fluororesin, may be used.

(Preparation of Non-Aqueous Secondary Battery)

As the shape of the non-aqueous secondary battery of the present invention, any form such as a sheet form, a rectangular form, or a cylindrical form can be applied as described above. The mixture of the positive electrode active substance or the negative electrode active substance is mainly used after being applied (coated) on a current collector, dried, and compressed.

Hereinafter, a bottomed cylindrical lithium secondary battery 100 will be taken as an example, and its configuration and a production method thereof will be described with reference to FIG. 2. In a battery having a bottomed cylindrical shape, since the external surface area relative to the power generating element to be charged is small, it is preferable to design the battery such that the Joule heating that is generated due to the internal resistance at the time of charging or discharging is efficiently dissipated to the outside. Furthermore, it is preferable to design the lithium secondary battery such that the filling ratio of a substance having high heat conductibility is increased so as to decrease the temperature distribution inside the battery. FIG. 2 is an example of a bottomed cylindrical lithium secondary battery 100. This cell is a bottomed cylindrical lithium secondary battery 100 in which a positive electrode sheet 14 and a negative electrode sheet 16 that are superimposed with a separator 12 interposed therebetween, are wound and accommodated in a packaging can 18. In addition, reference numeral 20 in the diagram represents an insulating plate, 22 represents an opening sealing plate, 24 represents a positive electrode current collector, 26 represents a gasket, 28 represents a pressure-sensitive valve body, and 30 represents a current blocking element. Meanwhile, the diagram inside the magnified circle is indicated with varying hatchings in consideration of visibility, but the various members are equivalent to the overall diagram by the reference numerals.

First, a negative electrode active substance is mixed with a solution prepared by dissolving a binder, a filler and the like that are used as desired in an organic solvent, and thus a negative electrode mixture is prepared in a slurry form or in a paste form. The negative electrode mixture thus obtained is uniformly applied over the entire surface of both sides of a metal core as a current collector, and then the organic solvent is removed to form a negative electrode mixture layer. Furthermore, the laminate of the current collector and the negative electrode mixture layer is rolled by using a roll pressing machine or the like to produce a laminate having a predetermined thickness, and thereby, a negative electrode sheet (electrode sheet) is obtained. At this time, the application method for each agent, the drying of applied matter, and the formation method for positive and negative electrodes may conform to the usual method.

In the present embodiment, a cylindrical battery has been explained as an example, but the present invention is not limited to this. For example, positive and negative electrode sheets produced by the methods described above are superimposed with a separator interposed therebetween, and then the assembly may be processed directly into a sheet-like battery. Alternatively, a rectangular-shaped battery may be formed by folding the assembly, inserting the assembly into a rectangular can, electrically connecting the can with the sheet, subsequently injecting an electrolyte, and sealing the opening by using an opening sealing plate.

In all of the embodiments, a safety valve can be used as an opening sealing plate for sealing the opening. Furthermore, an opening sealing member may be equipped with various safety elements that are conventionally known, in addition to the safety valve. For example, as overcurrent preventing elements, a fuse, a bimetal, a PTC element and the like are favorably used.

Furthermore, as a countermeasure for an increase in the internal pressure of the battery can, a method of inserting a slit in the battery can, a gasket cracking method, an opening sealing plate cracking method, or a method of disconnecting from a lead plate can be used in addition to the method of providing a safety valve. Furthermore, a protective circuit incorporated with an overcharge-coping member or an overdischarge-coping member may be provided to a charging machine, or the aforementioned protective circuit may be provided independently.

For the can or the lead plate, a metal or an alloy having electrical conductibility can be used. For example, metals such as iron, nickel, titanium, chromium, molybdenum, copper, and aluminum, or alloys thereof are favorably used.

For the welding method that may be used when a cap, a can, a sheet, and a lead plate are welded, any known methods (for example, an electric welding method using a direct current or an alternating current, a laser welding method, an ultrasonic welding method, and the like) can be used. As the sealing agent for sealing an opening, any conventionally known compounds such as asphalt, and mixtures can be used.

[Use of Non-Aqueous Secondary Battery]

Non-aqueous secondary batteries of the present invention are applied to various applications since secondary batteries having satisfactory cycle characteristics can be produced according to the present invention. There are no particular limitations on the application embodiment for the non-aqueous secondary battery, but in the case of mounting the non-aqueous secondary battery in electronic equipment, examples of the equipment include notebook computers, pen-input personal computers, mobile personal computers, electronic book players, mobile telephones, cordless phone handsets, pagers, handy terminals, portable facsimiles, portable copying machines, portable printers, headphone stereo sets, video movie cameras, liquid crystal television sets, handy cleaners, portable CDs, mini disc players, electric shavers, transceivers, electronic organizers, calculators, memory cards, portable tape recorders, radios, backup power supplies, and memory cards. Other additional applications for consumer use include automobiles, electromotive vehicles, motors, lighting devices, toys, game players, load conditioners, timepieces, strobes, cameras, and medical devices (pacemakers, hearing aids, shoulder massaging machines, and the like). Furthermore, the non-aqueous secondary battery can be used as various batteries for munition and space batteries. Also, the non-aqueous secondary battery can be combined with a solar cell.

EXAMPLES

Hereinafter, the present invention will be described in more detail with reference to examples, but the present invention is not limited to these examples.

Example 1/Comparative Example 1

Preparation of Liquid Electrolyte

The components shown in Table 1 were added to a liquid electrolyte of 1M $LiBF_4$ ethylene carbonate/γ-butyrolactone at a volume ratio of 3:7 by the amount described in Table 1 to prepare liquid electrolytes of this invention and liquid electrolytes of the comparative example. All viscosities at 25° C. of the prepared liquid electrolytes were 5 mPa·s or less.

<Preparation of Battery (1)>

A positive electrode was produced by using an active material: lithium nickel manganese cobalt oxide ($LiNi_{1/3}Mn_{1/3}Co_{1/3}O_2$) 85% by mass, a conductive assistant: carbon black 7% by mass and a binder: PVDF 8% by mass, and a negative electrode was produced by using an active material: lithium titanium oxide ($Li_4Ti_5O_{12}$) 94% by mass, a conductive assistant: carbon black 3% by mass and a binder: PVDF 3% by mass. A separator was 25 μm thick made of polypropylene. A 2032-type coin battery was produced for each test liquid electrolyte by using the above-mentioned positive and negative electrodes and separator to evaluate the following items. The results are shown in Table 1.

<Discharge Capacity Maintaining Ratio>

In a thermostatic chamber at 30° C., the battery was subjected to constant current charging at 0.1 C until the battery voltage reached 2.75 V, to charging at a constant voltage of 2.75 V until the current value reached 0.12 mA or for 2 hours, and then to constant current discharging at 1 C in a thermostatic chamber at 30° C. until the battery voltage reached 1.2 V. Thus, the discharge capacity was measured. This measurement was conducted before and after the high temperature cycle test described below to calculate a discharge capacity maintaining ratio in accordance with the following equation. As this value increases, even when charge/discharge is repeated under high temperature, the deterioration of the discharge capacity becomes less, which is satisfactory.

(Discharge Capacity Maintaining Ratio (RT Ratio (%))={(Discharge capacity 1)/(Discharge capacity 2)}×100

Discharge capacity 1: Discharge capacity after cycle test

Discharge capacity 2: Discharge capacity before cycle test

<Low Temperature Discharge Capacity Maintaining Ratio>

The discharge capacity maintaining ratio measured by changing the temperature upon discharging from 30° C. to −10° C. in the above-described test of discharging capacity maintaining ratio was defined as a low temperature discharge capacity maintaining ratio (LT ratio (%)).

<High Temperature Cycle Test>

The above-descried 2032-type coin battery was subjected to constant current charging at 1 C until the battery voltage reached 2.75 V in a thermostatic chamber at 45° C., subsequently to charging at a constant voltage of 2.75 V until the current value reached 0.12 mA or for 2 hours, and then to constant current discharging at 1 C until the battery voltage reached 1.2 V. This was defined as 1 cycle. This procedure was repeated up to 500th cycle.

TABLE 1

| Test* No. | Compound represented by formula (I) Comp. | Conc. | Polymerizable compound Comp. | Conc. | Other components Comp. | Conc. | RT ratio (%) | LT ratio (%) |
|---|---|---|---|---|---|---|---|---|
| 101 | (I)-1 | 0.005 | | | | | 82 | 77 |
| 102 | (I)-2 | 0.005 | | | | | 81 | 76 |
| 103 | (I)-3 | 0.005 | | | | | 82 | 77 |
| 104 | (I)-4 | 0.005 | | | | | 80 | 76 |
| 105 | (I)-5 | 0.005 | | | | | 82 | 76 |
| 106 | (I)-8 | 0.005 | | | | | 82 | 77 |
| 107 | (I)-9 | 0.005 | | | | | 81 | 76 |
| 108 | (I)-10 | 0.005 | | | | | 86 | 80 |
| 109 | (I)-12 | 0.005 | | | | | 85 | 80 |
| 110 | (I)-14 | 0.005 | | | | | 83 | 78 |
| 111 | (I)-10 | 0.001 | | | | | 80 | 75 |
| 112 | (I)-10 | 0.1 | | | | | 80 | 75 |
| 113 | (I)-10 | 0.05 | | | | | 86 | 80 |
| 114 | (I)-3 | 0.005 | VC | 0.05 | | | 91 | 82 |
| 115 | (I)-8 | 0.005 | VEC | 0.05 | | | 91 | 82 |
| 116 | (I)-10 | 0.005 | EA | 0.05 | | | 95 | 88 |
| 117 | (I)-12 | 0.005 | EA | 0.05 | | | 95 | 87 |
| 118 | (I)-14 | 0.005 | ST | 0.05 | | | 93 | 84 |
| c11 | | | | | | | 74 | 60 |
| c12 | | | | | BP | 0.005 | 75 | 60 |
| c13 | | | | | AP | 0.005 | 74 | 62 |
| c14 | | | VC | 0.05 | BP | 0.005 | 75 | 61 |
| c15 | | | VC | 0.05 | | | 75 | 60 |

<Notes in Table>
*Nos. beginning with c are Comparative Examples and Nos. except those are Examples of the present invention (sample Nos. of liquid electrolyte or secondary battery).

Compound represented by formula (I)
  Comp.: Compound
  Conc.: Concentration (M)
Compound represented by formula (I): see the exemplified compounds described above.
Comparative Compounds
  BP: Benzophenone
  AP: Acetophenone Polymerizable compound

VC

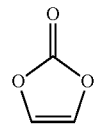

VEC

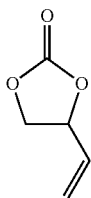

EA

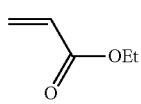

ST

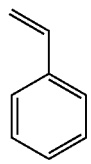

negative electrode was produced by using an active material: graphite 86% by mass, a conductive assistant: carbon black 6% by mass and a binder: PVDF 8% by mass. A separator was 25 μm thick made of polypropylene. A 2032-type coin battery was produced for the liquid electrolyte of each test Nos. by using the above-mentioned positive and negative electrodes and separator to evaluate the following items. The results are shown in Table 2.

<Discharge Capacity Maintaining Ratio and Low Temperature Discharging Capacity Maintaining Ratio>

Evaluation was conducted under the same conditions as the evaluation conducted for the battery 1, except that the upper voltage during charge was set to 4.3 V and the lower voltage during discharge was set to 2.75 V.

<High Temperature Cycle Test>

Evaluation was conducted under the same conditions as the evaluation conducted for the battery 1, except that the upper voltage during charge was set to 4.3 V and the lower voltage during discharge was set to 2.75 V.

TABLE 2

| Test* No. | Compound represented by formula (I) | | Polymerizable compound | | Other components | | RT ratio (%) | LT ratio (%) |
|---|---|---|---|---|---|---|---|---|
|  | Comp. | Conc. | Comp. | Conc. | Comp. | Conc. |  |  |
| 201 | (I)-3 | 0.005 |  |  |  |  | 73 | 66 |
| 202 | (I)-4 | 0.005 |  |  |  |  | 72 | 67 |
| 203 | (I)-5 | 0.005 |  |  |  |  | 71 | 66 |
| 204 | (I)-8 | 0.005 |  |  |  |  | 73 | 67 |
| 205 | (I)-9 | 0.005 |  |  |  |  | 73 | 67 |
| 206 | (I)-10 | 0.005 |  |  |  |  | 78 | 70 |
| 207 | (I)-12 | 0.005 |  |  |  |  | 77 | 70 |
| 208 | (I)-14 | 0.005 |  |  |  |  | 76 | 69 |
| 209 | (I)-3 | 0.005 | VC | 0.05 |  |  | 87 | 76 |
| 210 | (I)-8 | 0.005 | VEC | 0.05 |  |  | 87 | 76 |
| 211 | (I)-10 | 0.005 | EA | 0.05 |  |  | 84 | 74 |
| 212 | (I)-12 | 0.005 | EA | 0.05 |  |  | 84 | 73 |
| 213 | (I)-14 | 0.005 | ST | 0.05 |  |  | 87 | 76 |
| c21 |  |  |  |  |  |  | 60 | 40 |
| c22 |  |  |  |  | BP | 0.005 | 64 | 43 |
| c23 |  |  |  |  | AP | 0.005 | 67 | 44 |
| c24 |  |  | VC | 0.05 | BP | 0.005 | 68 | 49 |
| c25 |  |  | VC | 0.05 |  |  | 66 | 46 |

Example 2/Comparative Example 2

Preparation of Liquid Electrolyte

The components shown in Table 2 were added to a liquid electrolyte of 1M LiPF$_6$ ethylene carbonate/diethyl carbonate at a volume ratio of 1:2 by the amount described in Table 2 to prepare liquid electrolytes corresponding to each sample numbers. All viscosities at 25° C. of the prepared liquid electrolytes were 5 mPa·s or less.

Preparation of Battery (2)

A positive electrode was produced by using an active material: lithium cobalt oxide (LiCoO$_2$) 85% by mass, a conductive assistant: carbon black 7% by mass and a binder: PVDF (Poly(vinylidene difluoride)) 8% by mass, and a As seen from the above, the non-aqueous liquid electrolyte of the present invention and the secondary battery using the same allow achievement of improved performances in terms of the capacity maintaining properties at the time when charge and discharge is repeated at a high temperature, especially in terms of the low temperature discharging capacity maintaining property.

Having described our invention as related to the present embodiments, it is our intention that the invention not be limited by any of the details of the description, unless otherwise specified, but rather be construed broadly within its spirit and scope as set out in the accompanying claims.

This application claims a priority on Patent Application No. 2012-119056 filed in Japan on May 24, 2012, which is entirely herein incorporated by reference.

REFERENCE SIGNS LIST

1 Positive electrode conductive material
2 Positive electrode active material
3 Negative electrode conductive material
4 Negative electrode active material
5 Liquid electrolyte
6 Operating means
7 Circuit wiring
9 Separator
10 Lithium ion secondary battery
12 Separator
14 Positive electrode sheet
16 Negative electrode sheet
18 Packaging can double as a negative electrode
20 Insulating plate
22 Opening sealing plate
24 Positive electrode current collector
26 Gasket
28 Pressure-sensitive valve body
30 Current blocking element
100 Bottomed cylindrical lithium secondary battery

The invention claimed is:

1. A non-aqueous liquid electrolyte for a secondary battery, comprising:
a compound represented by formula (I);
an electrolyte; and
an organic solvent,
wherein the non-aqueous liquid electrolyte has a viscosity of 20 mPa·s at 25° C. or less,
wherein the compound represented by formula (I) is a compound represented by any one of formulas (I-1) to (I-4):

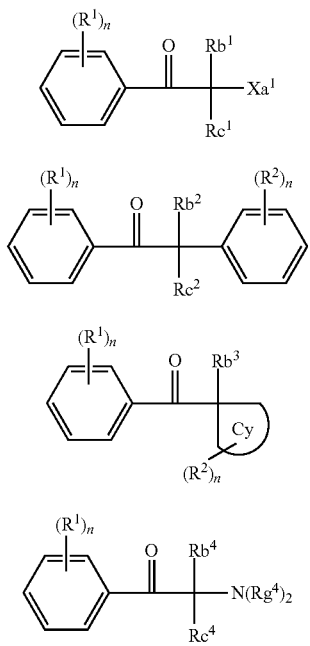

wherein $R^1$ represents an alkyl group having 1 to 4 carbon atoms, an alkylthio group having 1 to 4 carbon atoms, a halogen atom, an alkoxy group, or a non-cyclic amino group; $R^2$ represents an alkyl group having 1 to 4 carbon atoms, an alkylthio group having 1 to 4 carbon atoms, a halogen atom, an alkoxy group, or a (cyclic) amino group; n represents an integer from 0 to 5; and when n is 2 or more, $R^1$ and $R^2$ may be different from each other;

wherein $Rb^1$ and $Rc^1$ each represent an alkyl group having 1 to 4 carbon atoms; and $Xa^1$ represents a hydroxyl group, an acyloxy group, or an alkoxy group;

wherein $Rb^2$ represents a hydrogen atom, or an alkoxy group having 1 to 4 carbon atoms; and $Rc^2$ represents a hydroxyl group, an alkoxy group having 1 to 4 carbon atoms, or an acyloxy group;

wherein $Rb^3$ represents a hydroxyl group, an acyloxy group, or an alkoxy group; and Cy represents a 5- to 7-membered non-aromatic ring; and wherein $Rb^4$ and $Rc^4$ each represent an alkyl group having 1 to 4 carbon atoms, or an aralkyl group having 6 to 12 carbon atoms; $Rg^4$ represents an alkyl group having 1 to 4 carbon atoms; and in —$N(Rg^4)_2$, two $Rg^4$'s may combine to form a 5- to 7-membered ring structure which may contain a hetero atom.

2. The non-aqueous liquid electrolyte for a secondary battery according to claim 1, wherein an aromatic structure is contained in the structure represented by formula (I).

3. The non-aqueous liquid electrolyte for a secondary battery according claim 1, comprising a polymerizable compound.

4. The non-aqueous liquid electrolyte for a secondary battery according to claim 3, wherein the polymerizable compound is a compound represented by any one of formulas (3-a) to (3-d):

(3-a)

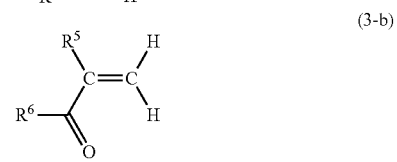

(3-b)

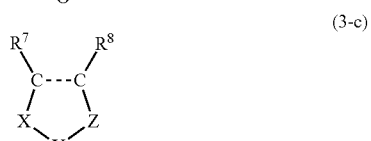

(3-c)

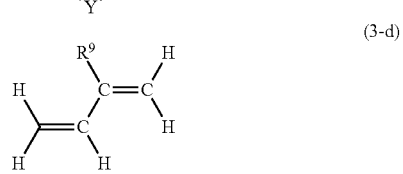

(3-d)

wherein $R^3$ represents a hydrogen atom or an alkyl group; $R^4$ represents an aromatic group, a heterocyclic group, a cyano group, an alkoxy group or an acyloxy group; $R^5$ represents a hydrogen atom, an alkyl group or a cyano group; $R^6$ represents an alkyl group, an alkoxy group or an amino group; $R^7$ and $R^8$ each represent a hydrogen atom, an alkyl group, an alkenyl group or an aromatic group; X, Y and Z each represent a divalent linking group selected from —O—, —S—, —(C=O)—, —C(=S)—, —NR—, —SO—, and —$SO_2$— which may form a 5- or 6-membered ring; R represents an alkyl group or an aromatic group; $R^9$ represents a hydrogen atom or an alkyl group; and the broken-line bond in formula (3-c) means a single bond or a double bond.

5. The non-aqueous liquid electrolyte for a secondary battery according claim 1, comprising 0.0001 to 0.1 mol/L of the compound represented by formula (I).

6. The non-aqueous liquid electrolyte for a secondary battery according claim 4, comprising 0.001 to 0.1 mol/L of the polymerizable compound.

7. The non-aqueous liquid electrolyte for a secondary battery according to claim 1, wherein an individual organic component to be contained in the non-aqueous liquid electrolyte has an average molecular weight of 1,000 or less.

8. A non-aqueous secondary battery, comprising the non-aqueous liquid electrolyte for a secondary battery according to claim 1.

9. The non-aqueous secondary battery according to claim 8, wherein the non-aqueous secondary battery comprises a lithium metal composite oxide including a nickel atom and/or a manganese atom as a material which constitutes a positive electrode thereof.

* * * * *